United States Patent [19]

Phillips et al.

[11] 4,100,181
[45] Jul. 11, 1978

[54] PROCESS FOR OBTAINING FREE FATTY ACIDS FROM SOAP STOCK

[75] Inventors: C. Frank Phillips; Dwight E. Leavens, both of Panama City, Fla.

[73] Assignee: SCM Corporation, Cleveland, Ohio

[21] Appl. No.: 795,513

[22] Filed: May 10, 1977

[51] Int. Cl.$^2$ .............................................. C11C 1/04
[52] U.S. Cl. .................... 260/416; 260/413; 260/418; 260/412.5; 260/424; 260/425; 252/370
[58] Field of Search .................. 260/413.5, 412.5, 416, 260/417, 418, 424, 425; 252/369, 370, 371

[56] References Cited

U.S. PATENT DOCUMENTS

| | | | |
|---|---|---|---|
| 2,686,794 | 8/1954 | Clayton | 268/412.5 |
| 2,802,845 | 8/1957 | Sadler | 260/412.5 |
| 2,812,343 | 11/1957 | Cox | 260/424 |
| 3,425,938 | 2/1969 | Bloomberg | 260/425 |
| 3,804,819 | 4/1974 | Wengrow | 260/418 |

FOREIGN PATENT DOCUMENTS 1,286,878  8/1972  United Kingdom .................. 260/416

*Primary Examiner*—Winston A. Douglas
*Assistant Examiner*—John F. Niebling
*Attorney, Agent, or Firm*—Merton H. Douthitt; James B. Wilkens

[57] ABSTRACT

Substantial benefits and economies are realized in a process for obtaining free fatty acids from soap stock by first acidulating the soap stock to liberate fatty acids from the soap present, separating the resulting first acid oil and aqueous saline phases, recovering free fatty acids by vacuum distillation from this first acid oil phase, saponifyng the glyceride-rich still residue to generate additional soap, acidulating the saponified product to liberate additional fatty acids therefrom and separating the resulting second acid oil and aqueous saline phases. These additional fatty acids can be recovered as free acids by vacuum distillation from the separated second acid oil phase. It is sometimes advantageous to neutralize residual mineral acid in the first acid oil phase before distillation.

12 Claims, 4 Drawing Figures

PROCESS FOR OBTAINING FREE FATTY ACIDS FROM SOAP STOCK

BACKGROUND OF THE INVENTION

This invention relates to an improvement in a process for obtaining free fatty acids from soap stocks, particularly those from alkali refining of vegetable oil. When glyceride oils, e.g., animal fats or vegetable oils, are refined to remove free fatty acids and other impurities by alkali refining, the aqueous alkaline solution which is separated from the bulk of the refined oil contains alkali soaps of fatty acids together with substantial quantities of free fatty acids, glycerides thereof, and various impurities including water-soluble phosphatides such as lecithin. Some of the free fatty acids, glycerides, and impurities ordinarily will be emulsified in the resulting aqueous mixture by the soaps and the phosphatide-type components. This aqueous mixture is commonly known as "soap stock". It can be subjected to further processing to convert the soaps and esters therein into free fatty acids for recovery.

In one such process the soap stock is first saponified with alkali, typically by heating with aqueous caustic soda. The proportion of such alkali used is ordinarily substantially in excess of the stoichiometric amount necessary to convert all free and esterified fatty acids present into alkali metal soaps. The saponified soap stock then is acidulated with mineral acid, typically aqueous sulfuric acid, to liberate fatty acids from their soaps. These free fatty acids are then separated from the resulting aqueous saline phase by decantation or centrifugation. Frequently, such a fatty acid phase is then vacuum distilled to give a fatty acid distillate. In some cases where fatty acid values of consequence remain in the still residue, such residue can be subjected to re-saponification, re-acidulation, re-separation of the resulting fatty acid and aqueous saline phases, and re-distillation of this fatty acid phase to recover additional fatty acid distillate. Substantial quantities of alkali and mineral acid are used in this process and corresponding large quantities of aqueous saline phase are generated for recovery or disposal.

Among the other methods which have been proposed for soap stock processing to reclaim fatty acids therefrom is that of U.S. Pat. No. 3,471,536. Therein soap stock from alkali refining of edible oils and fats is first acidulated, the resulting acid oil phase separated and the glycerides therein hydrolyzed at high temperature in an autoclave with water. The free fatty acids thus liberated are then distilled from this mixture. A main feature of the patent involves treating the hydrolyzed acid oil with certain amines to reduce the amounts of impurities distilled with the fatty acids. The thermal hydrolysis can generate high impurity contents, thereby imparting contamination to the product fatty acid or requiring additional processing for removal, i.e., by the amine treatment of U.S. Pat. No. 3,471,536. There is no saponification step. Advantages of the instant invention over prior proposals include economy, enhanced product quality, and suppression of impurities formation.

SUMMARY OF THE INVENTION

The present invention is a process for obtaining free fatty acids from soap stock, comprising:

(a) acidulating said soap stock with sufficient mineral acid to liberate the fatty acids from at least a major proportion of the soap present in said soap stock, thereby forming a first acid oil phase and a first aqueous saline phase;

(b) separating said first acid oil phase from said first aqueous saline phase;

(c) vacuum distilling the separated first acid oil phase to produce a first crude fatty acid distillate;

(d) saponifying the still residue from (c) with a stoichiometric excess of aqueous alkali;

(e) acidulating the saponified product from (d) with sufficient mineral acid to liberate the fatty acids from at least a major proportion of the soap present therein, thereby forming a second acid oil phase comprising predominantly free fatty acids and a second aqueous saline phase; and (f) separating said second acid oil phase from said second aqueous saline phase.

This process may conveniently be adapted for use as either a batch process comprising the foregoing steps as discrete batch operations or as a continuous process or as a composite process wherein some steps or sequences are operated continuously whereas other steps are performed batch-wise. The basic process as described above may also be modified in a number of different ways within the concept of the present invention. Thus the separated first acid oil phase from (b) may be partially neutralized with alkali before vacuum distilling this acid oil phase in (c). Also the process may be continued by vacuum distilling the separated second acid phase to produce a second crude fatty acid distillate. In other embodiments, portions of the product stream may be recycled. Thus a portion of the saponified product from (d) can be recycled for acidulation conjointly with the initial soap stock or a portion of the unseparated second acid oil and aqueous saline phases from (e) can be recycled for separating conjointly with the unseparated first acid oil and aqueous saline phases from (a) or at least a portion of the separated second acid oil phase from (f) can be recycled for vacuum distillation conjointly with the separated first acid oil phase from (b).

In an alternative embodiment, the process of the present invention is a process for obtaining free fatty acids from an acid oil starting material which comprises a mixture of fatty acid glyceride and fatty acid and which has a pH less than about 7, the process comprising:

(A) vacuum distilling the acid oil to produce a first crude fatty acid distillate;

(B) saponifying the still residue from (A) with a stoichiometric excess of aqueous alkali;

(C) acidulating the saponified product from (B) with sufficient mineral acid to liberate the fatty acids from at least a major proportion of the soap present therein, thereby forming an acid oil phase comprising predominantly free fatty acids and an aqueous saline phase;

(D) separating said acid oil phase from said aqueous saline phase; and (E) vacuum distilling the separated acid oil phase from (D) to produce a second crude fatty acid distillate;

DESCRIPTION OF PREFERRED EMBODIMENTS

Figure 1:
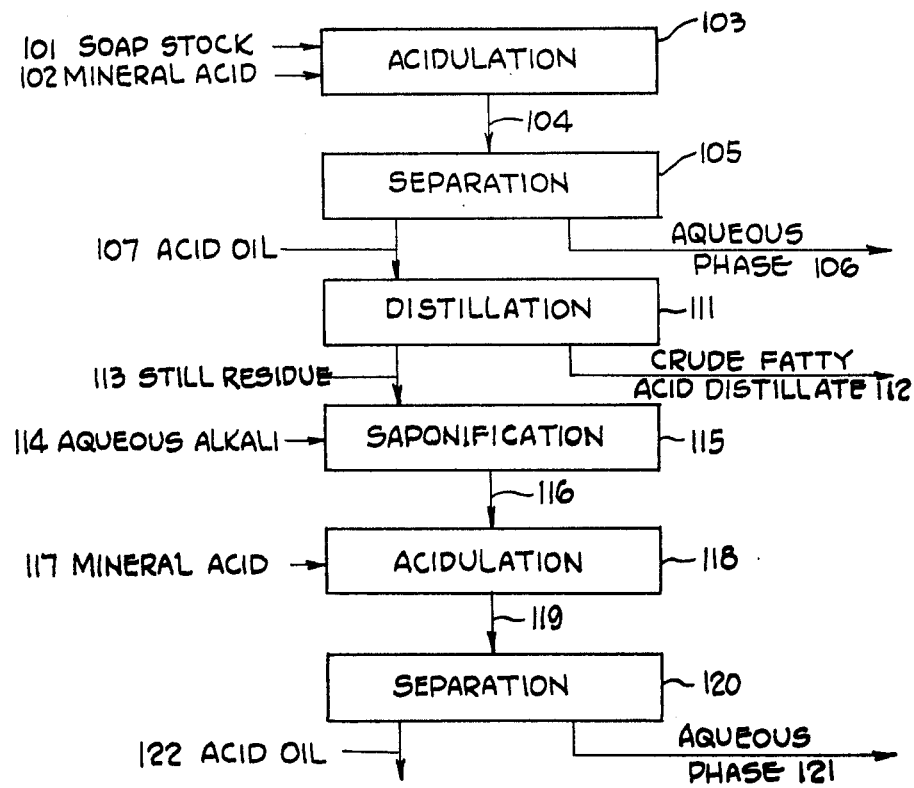
FIG. 1 shows a schematic flow diagram of the process of this invention. Soap stock 101 is acidulated with sufficient mineral acid 102 in acidulation step 103, corresponding to step (a) of the above summary description of the process, to liberate the fatty acids from a major proportion of the soap present. The unseparated first acid oil and aqueous saline phases 104 formed thereby are separated from each other in separation step 105, corresponding to step (b), the separated first aqueous saline phase 106 being removed for recycle, disposal or recovery of salt therefrom. The separated first acid oil phase 107 is vacuum distilled in distillation step 111, corresponding to step (c), to give a first crude fatty acid distillate 112. The still residue 113, comprising largely fatty acid glycerides together with some free fatty acids and other materials, is saponified with a stoichiometric excess of aqueous alkali 114 in saponification step 115, corresponding to step (d), and the saponified product 116 therefrom is acidulated with sufficient mineral acid 117 to liberate the fatty acids from a major proportion of the soap present therein in acidulation step 118, corresponding to step (e). The unseparated second acid oil and aqueous saline phases 119 are separated from each other in separation step 120, corresponding to step (f). The separated second aqueous saline phase 121 is removed for disposal, recovery of salt therefrom or, optionally, may be recycled for use as wash liquor in the process. The separated second acid oil phase 122 contains predominantly free fatty acids and may be used directly as a source of fatty acids or may be purified by further processing.
Figure 2:
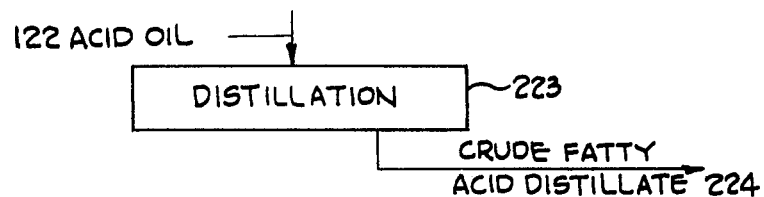
FIG. 2 diagrams an extension of the process diagramed in FIG. 1 in which the separated second acid oil phase 122 is vacuum distilled in distillation step 223 to give a second crude fatty acid distillate 224.
Figure 3:
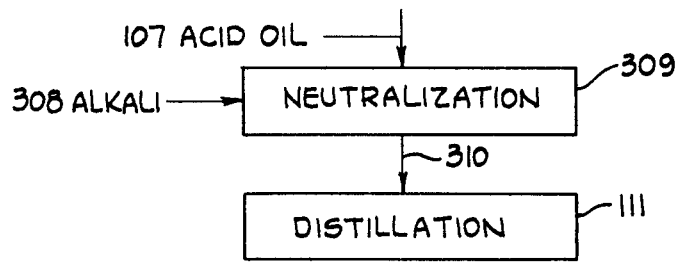
FIG. 3 diagrams the insertion in the process diagramed in FIG. 1 of a neutralization step 309 for partially neutralizing the separated first acid oil phase 107 with alkali 308 before this partially neutralized acid oil phase 310 is vacuum distilled in distillation step 111.

The soap stocks which comprise starting material for the process herein described are by-products from the processing of fats and oils which are natural products. They are, therefore, subject to substantial variability as to their composition, properties and processing characteristics, even when they derive from nominally similar prior processing of nominally similar fat or oil. In particular, since it is one of the objects of the prior alkali refining process to remove impurities from the refined oil product, the impurities present in the by-product soap stock are subject to great variability. It is, therefore, desirable that methods for further processing of soap stocks not be critically sensitive to substantial variability in the starting soap stock, and this is true of the present process. Nonetheless, it will sometimes be found necessary to make adjustments in one or more of the processing conditions within the scope of the present invention to adapt this method for efficient processing of any particular soap stock. In general these adjustments will be straightforward applications of conventional engineering principles and well within the skill of those knowledgeable in soap stock, glyceride oil, or fatty acid processing.

The process may be regarded as commencing with a vacuum distillation step, as indicated above, using as starting material an acid oil comprising amixture of fatty acid glyceride and fatty acid and having a pH less than about 7. As already indicated, this acid oil starting material can be partially or totally derived from soap stock from alkali refining, but it may also derive either totally or in part from other sources, such as low grade or contaminated fatty oil- or fatty acid-containing by-product from other processes. Where soap stock is to comprise all or part of the ultimate source of fatty acids produced by this process, and where any shipment or storage before distilling is contemplated, it will usually be found advantageous to acidulate the soap stock and separate the resulting acid oil phase for shipment or storage, since otherwise a great deal of water will be required to be shipped and/or stored.

As acidulating acid for both acidulation steps, aqueous sulfuric acid of about 10 to 30 percent concentration is preferred, but other concentrations up to about 50 percent can be used advantageously. Other strong inorganic acids such as hydrochloric acid can also be employed for the acidulation. The pH in the acidulated mixtures in both acidulation steps is preferably about 2 to 4 and the acidulating temperature in both acidulations from about 40 to 100° C., preferably about 90° C. It is preferred to avoid boiling so as to minimize the production of undesirable foam.

The separations of the acid oil phases from the aqueous saline phases following the acidulation steps can be accomplished by allowing the mixtures to settle and then decanting one phase from the other, but in commercial processes separation by centrifuging may ordinarily be found more economical. It may sometimes be found advantageous to add conventional cosolvents or surfactants to improve the degree and/or speed of separation and it will normally be desirable to wash the separated acid oil phases with water or with one of the aqueous saline phases recycled for this purpose. Each separation step in the process may consist of a single-stage separation or may be a cascaded multi-stage separation.

The distillation step or steps can be performed in conventional vacuum distillation apparatus, preferably as a stripping distillation without substantial fractionation of the crude fatty acid distillates. It may, however, be desirable to separate in the distillation step a more volatile impurity fraction from the crude fatty acid distillate. The distillation temperatures required will be from about 180 to 300° C. with pressures from about 1 to 10 Torr.

The saponification can be accomplished with any strong aqueous alkali, but sodium hydroxide solutions are ordinarily preferred. It is generally desirable to use only a small excess of alkali above that stoichiometrically required to saponify the fatty acid glycerides and neutralize any free fatty acids present, e.g. about 2–5% excess, but the saponification can be done with larger excesses of alkali up to as much as 100 percent excess. While alkali excesses even greater than 100 percent can be employed in the saponification, the use of large excesses is unnecessary and should ordinarily be avoided in order to fully realize the benefit of the present invention in reducing the amount of alkali consumed and the amount of salt by-product produced upon subsequent acidulation. The saponification should be done at elevated temperatures, preferably at about 90° C., and can be done at atmospheric pressure. It is preferred that the saponifying mixture not be boiled, since this tends to produce undesirable foaming.

While the process can advantageously be operated as either a batch process or a continuous process or as a composite process with some steps operated batchwise and others operated continuously, in commercial practice a continuous process will ordinarily be found most advantageous. In designing a plant to perform this process, only conventional selection of equipment for the various steps and incidental piping, connections, valves, holding tanks, and control and measuring devices is required. Since corrosive chemicals such as alkali and mineral acid are present in the process, conventional engineering practice will require that much of the material of construction of the apparatus employed will be corrosion resistant. Austenitic stainless steels, for example, will be satisfactory in most circumstances.

Among the advantages of the present process are that it can be operated efficiently with the consumption of significantly less alkali and mineral acid, with production of correspondingly less salt by-product, than a process in which the soap stock is directly saponified before any free fatty acid is removed by stripping distillation. It is also found that the present process produces crude fatty distillates having relatively little color and low contamination with unsaponifiable impurities. These crude fatty acid distillates will, nonetheless, frequently be subjected to further processing for additional purification and separation, as by fractional vacuum distillation. As compared to high temperature, high pressure direct hydrolysis, saponification splits the fatty glycerides with minimal impurity formation and in equipment of relatively modest cost and complexity of operation.

EXAMPLE

Figure 4:
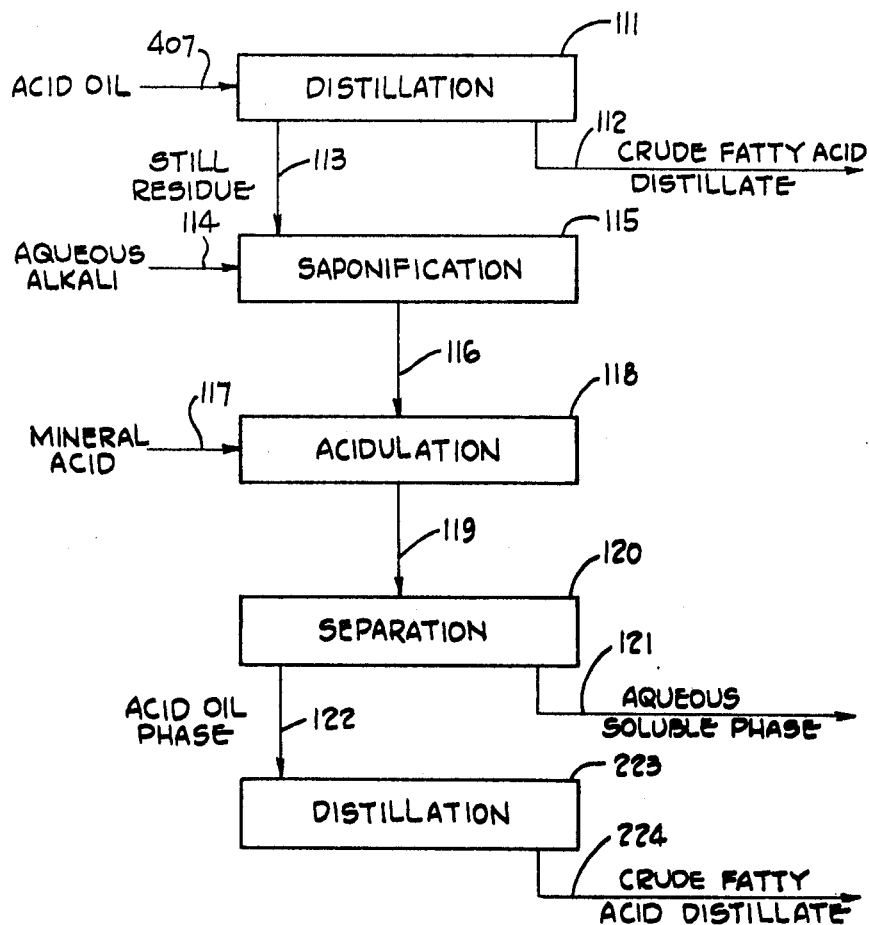
FIG. 4 diagrams a process for obtaining fatty acids from an acid oil starting material 407 which comprises a mixture of fatty acid glyceride and fatty acid and which has a pH less than about 7. This acid oil starting material may derive entirely or in part from soap stock from alkali refining by prior acidulation and separation of the acidulated soap stock into oil and aqueous phases, but it mayalso incorporate or be entirely comprised of fatty acid glyceride and fatty acid from other sources including recycle and by-product streams from other processing operations. This acid oil is vacuum distilled in distillation step 111 to give a first crude fatty acid distillate 112. The still residue 113, comprising largely fatty acid glycerides together with some free fatty acids and other materials, is saponified with a stoichiometric excess of aqueous alkali 114 in saponification step 115, and the saponified product 116 therefrom is acidulated with sufficient mineral acid 117 to liberate the fatty acids from a major proportion of the soap present therein in acidulation step 118. The unseparated acid oil and aqueous saline phases 119 are separated from each other in separation step 120. The separated aqueous saline phase 121 is removed for disposal, recovery of salt therefrom or for use as a wash liquor. The separated acid oil phase 122 is vacuum distilled in distillation step 223 to give a second crude fatty acid distillate.

The process according to the flow diagram of FIG. 4 will be illustrated by this example, in which all parts are by weight. 22,000 parts of a commercial acid oil comprising a mixture of acid oils conventionally derived from vegetable oil soap stocks, the major proportion being derived from cottonseed oil soap stocks by mineral acid acidulation followed by separation from the aqueous saline phase, is used as starting material. The acid number of this material is 83, its saponification number 194, its pH 4 and it contains one percent moisture. This acid oil is first vacuum distilled in a stripping tower at 230° C. and 6 Torr to give 15,050 parts of a first crude fatty acid distillate having acid number of 199 and Gardner color of 9. 14,650 parts of still residue having specific gravity of 0.91, acid number of 65 and saponification number of 182 is transferred to a stirred reactor. 3,943 parts of 50 percent sodium hydroxide solution together with sufficient water to give a 50 percent soap solution is added thereto and the mixture maintained between 80 and 90° C. for two hours. Sulfuric acid solution containing 2,450 parts of sulfuric acid is slowly added and the acidulated mixture stirred for 1½ hours while the temperature is maintained between 90 and 95° C. This mixture has a pH of 3 and is centrifuged to separate the acid oil phase and the aqeous saline phase. 13,200 parts of the separated acid oil phase is recovered and re-cycled to the vacuum distillation tower and there distilled at 235° C. and 6 Torr. 8,580 parts of a second crude fatty acid distillate are recovered and have substantially the same properties as the first distillate. As indicated above, the exact conditions, yields and properties will vary somewhat depending upon the rather variable composition of the starting material which comprises by-product from the processing of natural products.

What is claimed is:

1. A process for obtaining free fatty acids from soap stock, comprising:
   (a) acidulating said soap stock with sufficient mineral acid to liberate the fatty acids from at least a major proportion of the soap present in said soap stock, thereby forming a first acid oil phase and a first aqueous saline phase;
   (b) separating said first acid oil phase from said first aqueous saline phase;
   (c) vacuum distilling the separated first acid oil phase to produce a first crude fatty acid distillate;
   (d) saponifying the still residue from (c) with a stoichiometric excess of aqueous alkali;
   (e) acidulating the saponified product from (d) with sufficient mineral acid to liberate the fatty acids from at least a major proportion of the soap present therein, thereby forming a second acid oil phase comprising predominantly free fatty acids and a second aqueous saline phase; and
   (f) separating said second acid oil phase from said second aqueous saline phase.

2. A process according to claim 1, further comprising:
   (g) vacuum distilling the separated second acid oil phase to produce a second crude fatty acid distillate.

3. A process according to claim 1 wherein said soap stock is derived from alkali refining of vegetable oil.

4. A process according to claim 3 wherein said vegetable oil comprises a major proportion by weight of soybean oil or cottonseed oil or a mixture thereof.

5. A process according to claim 1 where said process is a continuous process.

6. A process according to claim 1 wherein a portion of the saponified product from (d) is recycled for acidulation conjointly with said soap stock, whereby, to the extent of the recycle, acidulation (e) and separation (f) are conjoined with, respectively, acidulation (a) and separation (b) and said second acid oil phase and said second aqueous saline phase are merged upon formation with, respectively, said first acid oil phase and said first aqueous saline phase.

7. A process according to claim 1 wherein at least a portion of the unseparated second acid oil and aqueous saline phases from (e) is recycled for separating conjointly with the unseparated first acid oil and aqueous saline phases from (a), whereby the recycled portions of said second acid oil phase and said second aqueous saline phase from (e) are merged with, respectively, said first acid oil phase and said first aqueous saline phase from (a) and, to the extent of the recycle, separation (f) is conjoined with separation (b).

8. A process according to claim 1 wherein at least a portion of the separated second acid oil phase from (f) is recycled for vacuum distilling conjointly with the separated first acid oil phase from (b).

9. A process according to claim 2 wherein at least a portion of the separated second acid oil phase from (f) is recycled for vacuum distilling conjointly with the separated first acid oil phase from (b), whereby, to the extent of the recycle, distillation (g) is conjoined with distillation (c) and said second crude fatty acid distillate is merged with said first crude fatty acid distillate.

10. A process according to claim 1, further comprising:
(b') partially neutralizing with alkali the separated first acid oil phase from (b) before vacuum distilling this acid oil phase in (c).

11. A process for obtaining fatty acids from an acid oil comprising a mixture of fatty acid glyceride and free fatty acid and having pH less than 7, said process comprising:
(A) vacuum distilling said acid oil, thereby producing a first crude fatty acid distillate;
(B) saponifying the still residue from (A) with a stoichiometric excess of aqueous alkali;
(C) acidulating the saponified mixture from (B) with sufficient mineral acid to liberate fatty acids from the soap therein, thereby forming an acid oil phase and an aqueous saline phase;
(D) separating said phases; and
(E) vacuum distilling the acid oil phase separated in (D), thereby producing a second crude fatty acid distillate.

12. A process according to claim 11 wherein said acid oil comprises a mixture of vegetable oil fatty acid glyceride and vegetable oil fatty acid.

* * * * *

UNITED STATES PATENT AND TRADEMARK OFFICE
CERTIFICATE OF CORRECTION

PATENT NO. : 4,100,181
DATED : July 11, 1978
INVENTOR(S) : C. Frank Phillips; Dwight E. Leavens It is certified that error appears in the above—identified patent and that said Letters Patent are hereby corrected as shown below:

On the title page, item [73] Assignee, change "SCM Corporation, Cleveland, Ohio" to --Sylvachem Corporation, Signed and Sealed this Twentieth Day of February 1979

[SEAL]

*Attest:*

RUTH C. MASON
*Attesting Officer*

DONALD W. BANNER
*Commissioner of Patents and Trademarks*